(12) United States Patent
Yan et al.

(10) Patent No.: US 9,166,489 B2
(45) Date of Patent: Oct. 20, 2015

(54) LAYOUTS OF MULTIPLE TRANSFORMERS AND MULTIPLE RECTIFIERS OF INTERLEAVING CONVERTER

(75) Inventors: Chao Yan, Shanghai (CN); Yiqing Ye, Shanghai (CN); Zhizhen Lian, Shanghai (CN); Jianping Ying, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 327 days.

(21) Appl. No.: 13/542,213

(22) Filed: Jul. 5, 2012

(65) Prior Publication Data

US 2012/0275197 A1 Nov. 1, 2012

Related U.S. Application Data

(63) Continuation-in-part of application No. 13/090,925, filed on Apr. 20, 2011, now Pat. No. 8,279,633, which is a continuation of application No. 12/394,571, filed on Feb. 27, 2009, now abandoned.

(30) Foreign Application Priority Data

Mar. 15, 2012 (CN) .......................... 2012 1 0068354

(51) Int. Cl.
*H02J 1/10* (2006.01)
*H02M 3/337* (2006.01)
(Continued)

(52) U.S. Cl.
CPC .......... *H02M 3/337* (2013.01); *H02M 3/33592* (2013.01); *H02M 2001/0074* (2013.01); *Y02B 70/1433* (2013.01); *Y02B 70/1475* (2013.01)

(58) Field of Classification Search
USPC .......... 363/15, 16, 21.02, 65, 71, 95, 97, 131, 363/141, 144, 146, 147, 17; 361/718, 719, 361/720, 736, 748, 764, 807, 808, 809, 810, 361/829, 230, 832, 836
See application file for complete search history.

(56) References Cited

U.S. PATENT DOCUMENTS 6,344,979 B1 * 2/2002 Huang et al. .................... 363/16
7,030,512 B2 * 4/2006 Krein .............................. 307/77
(Continued)

FOREIGN PATENT DOCUMENTS

| CN | 101552557 A | 10/2009 |
|---|---|---|
| TW | 200627770 A | 8/2006 |
| TW | 200939602 A | 9/2009 |

OTHER PUBLICATIONS

Orietti, E. et al., Analysis of Multi-Phase LLC Resonant Converters, Power Electronics Conference, COBEP '09, pp. 464-471, 2009, Brazil.

(Continued)

*Primary Examiner* — Nguyen Tran
(74) *Attorney, Agent, or Firm* — Yunling Ren; Eaton & Van Winkle

(57) ABSTRACT

The present invention relates to multi-phase parallel-interleaved converter circuits with each phase having two or more transformers and two or more rectifiers electrically coupled to the two or more transformers, and layouts of the transformers and the rectifiers of the multi-phase parallel-interleaved converter circuits. In the layouts, the multiple transformers and the multiple rectifiers of the multi-phase converters are interleavingly arranged to be symmetrical to common output polarized capacitor(s) so as to ensure the rectifier outputs of each phase relative to the common output polarized capacitors is symmetrical, thereby reducing the output ripples of the current of the output capacitors.

11 Claims, 7 Drawing Sheets

(51) Int. Cl.
  *H02M 3/335* (2006.01)
  *H02M 1/00* (2007.01)

(56) References Cited

U.S. PATENT DOCUMENTS

| | | | |
|---|---|---|---|
| 2004/0037092 A1* | 2/2004 | Kurio et al. | 363/17 |
| 2004/0233685 A1 | 11/2004 | Matsuo et al. | |
| 2005/0207180 A1 | 9/2005 | Pansier | |
| 2008/0190906 A1* | 8/2008 | Aigner | 219/130.21 |
| 2009/0168461 A1* | 7/2009 | Nakahori | 363/17 |
| 2013/0083563 A1* | 4/2013 | Wang et al. | 363/17 |

OTHER PUBLICATIONS

"First Office Action" issued by the State Intellectual Property Office of the People's Republic of China on Nov. 25, 2014.

"First Office Action" issued by the Intellectual Property Office, Ministry of Economic Affairs, R.O.C. dated Mar. 19, 2014.

\* cited by examiner

LAYOUTS OF MULTIPLE TRANSFORMERS AND MULTIPLE RECTIFIERS OF INTERLEAVING CONVERTER

CROSS-REFERENCE TO RELATED PATENT APPLICATION

This application is a continuation-in-part application of a co-pending U.S. patent application Ser. No. 13/090,925, filed on Apr. 20, 2011, entitled "PARALLEL-CONNECTED RESONANT CONVERTER CIRCUIT AND CONTROLLING METHOD THEREOF", by Haoyi Ye et al., which itself is a continuation application of U.S. patent application Ser. No. 12/394,571, Feb. 27, 2009, entitled "PARALLEL-CONNECTED RESONANT CONVERTER CIRCUIT AND CONTROLLING METHOD THEREOF", by Haoyi Ye et al., which status is abandoned and which itself claims priority to and the benefit of, pursuant to 35 U.S.C. §119(a), Taiwan patent application No. 097109222, filed on Mar. 14, 2008, entitled "PARALLEL-CONNECTED RESONANT CONVERTER CIRCUIT AND CONTROLLING METHOD THEREOF", by Haoyi Ye et al., all of the contents of which are incorporated herein by reference in their entireties.

This application also claims priority to and the benefit of, pursuant to 35 U.S.C. §119(a), Chinese patent application No. 201210068354.0, filed Mar. 15, 2012, entitled "LAYOUTS OF MULTIPLE TRANSFORMERS AND MULTIPLE RECTIFIERS OF INTERLEAVING CONVERTER", by Chao Yan et al., the content of which is incorporated herein by reference in its entirety.

FIELD OF THE INVENTION

The present invention generally relates to interleaving converter circuits having multiple transformers and multiple rectifiers, and more particularly, to a resonant converter, and layouts of the multiple transformers and the multiple rectifiers of the interleaving LLC-SRC circuits.

BACKGROUND OF THE INVENTION

An LLC series-resonant converter (LLC-SRC) has found widespread applications in power supply devices, because of its advantages over other types of converters. For example, its design is relatively simple, and can achieve the zero voltage switching (ZVS) operation of the primary MOS (metal-oxide semiconductor) and the zero current switching (ZCS) operation of the secondary MOS in a full load range, thereby enhancing the system efficiency.

However, the output current of the LLC-SRC has a "half-chord" waveform. Additionally, when the switching frequency is lower than the resonant frequency, the current of the secondary MOS is un-continued and its peaks are relatively high, which increase not only the predefined/specification values of component currents, but also the conduction losses of the converter.

The conventional LLC-SRC has drawbacks of which the output current has large ripples. In order to meet relatively same output voltage ripples of a conventional PWM converter and requirements of the current ripples of the capacitor, the outputs need to be parallel-coupled to a number of capacitors. To apply the LLC-SRC in strong current situations, it is necessary to adapt an interleaving mode, that is, two or N LLC-SRCs are parallel-connected/interleaved. Using a control circuit to make the switches of each LLC-SRC driven with a 90° or 180°/N shift may effectively reduce the output current ripples and increase the frequency of the output current ripples, thereby reducing the number of the output capacitors, lowering the specifications of the power switching elements, so as to achieve the goal of reducing costs and increasing the output power and the power density while still having the advantages of the LLC-SRC ZVS and ZCS.

The parallel-interleaved LLC-SRC is applicable to power supplies of high power and high current. The parallel-interleaved LLC-SRC mainly refers to a converter in which the outputs of two or more LLC-SRCs are parallel-connected and coupled to a common output filter capacitor. When two LLC-SRCs are interleaved, there are two types of input connections: one is that the inputs are parallel-connected, which is adapted for the low input voltages and used only for power amplification. The other is that the inputs are series-connected, where a three-phase PFC is generally coupled prior to the inputs. Accordingly, the use of switches with lower voltage stress meets the requirements of high input voltages. In the two-phase interleaved LLC-SRC, the distribution of the rectifier outputs at the secondary side is symmetrical relative to the common output capacitor, whereby the amplitudes of the output currents of the rectifiers in the two phases are equal, while and phases are shifted at 90°. After the output currents are superpositioned, an output current of the output capacitor with small ripples can be achieved.

However, in practice, the length difference of the conductive wires transmitting the rectifier outputs of the secondary sides of the two-phase interleaved LLC-SRC to the common output capacitor may result in different parasitic resistances and parasitic inductances therein, thereby inevitably causing the asymmetry of the output currents. Consequently, the amplitude and phase shifts are generated in the two-phase rectifier output currents, which result in the increase of the ripple current of the output capacitor, and deteriorating the parallel-interleaved effect.

In the low-voltage and strong-current applications, due to product specifications, each parallel-interleaved LLC-SRC may have two or more transformers. Considering the limitation of the current stress of the rectifier MOS and the cost, each LLC-SRC may have two or more corresponding rectifiers. If the layouts of the transformers and rectifiers are not appropriated, the interleaving effect will be greatly reduced.

Therefore, a heretofore unaddressed need exists in the art to address the aforementioned deficiencies and inadequacies.

SUMMARY OF THE INVENTION

The present invention, in one aspect, relates to a converter circuit. In one embodiment, the converter circuit has a first output and a second output, and comprises a first converter and a second converter.

Each converter includes a switch network circuit; a first transformer and a second transformer, each transformer having a primary winding and at least one secondary winding, wherein the switch network circuit and the primary windings of the first and second transformers are electrically connected to each other; and a first rectifier and a second rectifier electrically coupled to the secondary windings of the first transformer and the second transformer, respectively, each rectifier having a first output and a second output.

The first and second outputs of the first rectifiers of the first and second converters are electrically parallel-connected to a first output capacitor that is electrically connected between the first and second outputs of the converter circuit. The first and second outputs of the second rectifiers of the first and second converters are electrically parallel-connected to a second output capacitor that is electrically connected between the first and second outputs of the converter circuit.

In one embodiment, each converter has a first input and a second input. The second input of the first converter is electrically series-connected to the first input of the second converter. The first input of the first converter and the second input of the second converter are electrically coupled to a voltage source for receiving an input voltage.

In one embodiment, each resonant converter further comprises a switch network circuit, electrically coupled between the first and second inputs and the resonant tank. In one embodiment, the switch network circuit of each resonant converter comprises a half-bridge circuit or a full-bridge circuit.

In one embodiment, each of the first and second output capacitors comprises one or more high frequency filtering capacitors.

In one embodiment, each of the first and second rectifiers of each resonant converter comprises a half-bridge circuit or a full-bridge circuit.

In another aspect, the present invention relates to a layout of the resonant converter circuit as disclosed above.

In one embodiment, the layout includes a main board, a first sub-board and a second sub-board spaced-apart and vertically attached to the main board along a predetermined direction. The first rectifiers of the first and second resonant converters and the first output capacitor are spaced-apart disposed on one side of the first sub-board such that the first output capacitor is placed between the first rectifiers of the first and second resonant converters, and the first transformers of the first and second resonant converters are mounted on the other side of the first sub-board, spatially aligned with and electrically connected to the first rectifiers of the first and second resonant converters, respectively. The second rectifiers of the first and second resonant converters and the second output capacitor are spaced-apart disposed on one side of the second sub-board such that the second output capacitor is placed between the second rectifiers of the first and second resonant converters, and the second transformers of the first and second resonant converters are mounted on the other side of the second sub-board, spatially aligned with and electrically connected to the second rectifiers of the first and second resonant converters, respectively.

In one embodiment, the first rectifiers of the first and second resonant converters are placed symmetrically on two sides of the first output capacitor, and wherein the second rectifiers of the first and second resonant converters are placed symmetrically on two sides of the second output capacitor.

In one embodiment, the first transformers of the first and second resonant converters are mounted on the other side of the first sub-board by fixing pins of the secondary windings of the first transformers of the first and second resonant converters symmetrically on the first sub-board. The second transformers of the first and second resonant converters are mounted on the other side of the second sub-board by symmetrically fixing pins of the secondary windings of the second transformers of the first and second resonant converters symmetrically on the second sub-board.

In one embodiment, each sub-board has a positive output port and a negative output port electrically parallel-connected to a respective one of the first and second output capacitors. The positive and negative output ports of the first sub-board are electrically parallel-connected to the positive and negative output ports of the second sub-board, respectively, which are electrically parallel-connected to the first and second outputs of the resonant converter circuit.

The layout may further comprises one or more polarized capacitors disposed on the main board, and wherein the one or more polarized capacitors are electrically parallel-connected to the first and second outputs of the resonant converter circuit.

In yet another aspect, the present invention relates to a layout of the resonant converter circuit as disclosed above. In one embodiment, the layout includes a main board, and a sub-board vertically attached to the main board. The first rectifier of the first resonant converter, the first output capacitor, the first rectifier of the second resonant converter, the second rectifier of the first resonant converter, the second output capacitor and the second rectifier of the second resonant converter are spaced-apart and orderly disposed on one side of the sub-board along a predetermined direction such that the first output capacitor is placed between the first rectifier of the first resonant converter and the first rectifier of the second resonant converter, and the second output capacitor is placed between the second rectifier of the first resonant converter and the second rectifier of the second resonant converter. The first transformer of the first resonant converter, the first transformer of the second resonant converter, the second transformer of the first resonant converter and the second transformer of the second resonant converter are orderly mounted on the other side of the sub-board, spatially aligned with and electrically connected to the first rectifier of the first resonant converter, the first rectifier of the second resonant converter, the second rectifier of the first resonant converter and the second rectifier of the second resonant converter, respectively.

In one embodiment, the first transformer of the first resonant converter, the first transformer of the second resonant converter, the second transformer of the first resonant converter and the second transformer of the second resonant converter are orderly mounted on the other side of the first sub-board by fixing pins of the secondary windings of the corresponding transformers on the sub-board.

In one embodiment, the sub-board has a first positive output port and a first negative output port electrically parallel-connected to the first output capacitor, and a second positive output port and a second negative output port electrically parallel-connected to the second output capacitor. The first positive output port and the first negative output port electrically parallel-connected to the second positive output port and the second negative output port, which are electrically parallel-connected to the first and second outputs of the resonant converter circuit.

In one embodiment, the layout may also have one or more polarized capacitors disposed on the main board, and wherein the one or more polarized capacitors are electrically parallel-connected to the first and second outputs of the resonant converter circuit.

In a further aspect, the present invention relates to a resonant converter circuit. In one embodiment, the resonant converter circuit has a first output and a second output, and includes M resonant converters, $\{G_m\}$, m=1, 2, 3, ..., M, M being an integer greater than one. Each resonant converter $G_m$ includes an resonant tank; N transformers $\{T_{m,n}\}$, and N rectifiers, $\{R_{m,n}\}$, n=1, 2, 3, ... N, N being an integer greater than one. Each transformer $T_{m,n}$ has a primary winding and at least one secondary winding. The resonant tank and the primary windings of the N transformers are electrically connected to each other in series. Each rectifier $R_{m,n}$ having a first output and a second output, and electrically coupled to the at least one secondary winding of a respective transformer $T_{m,n}$.

In one embodiment, the multiple transformers $\{T_{m,n}\}$ and the multiple rectifiers $\{R_{m,n}\}$ of the M resonant converters $\{G_m\}$ are arranged in N groups such that each group includes the n-th transformers $T_{1,n}, T_{2,n}, T_{3,n}, \ldots T_{M,n}$ and the n-th rectifiers $R_{1,n}, R_{2,n}, R_{3,n}, \ldots R_{M,n}$ of the M resonant converters $\{G_m\}$. For each group, the first and second outputs of the n-th rectifiers $R_{1,n}, R_{2,n}, R_{3,n}, \ldots R_{M,n}$ of the M resonant converters $\{G_m\}$ are electrically parallel-connected to a n-th output capacitor, $C_{Fn}$, which is electrically connected between the first and second outputs of the resonant converter circuit.

In one embodiment, each resonant converter $G_m$ has a first input and a second input, wherein the second input of any one but the last resonant converter $G_m$ is electrically series-connected to the first input of its immediate next resonant converter $G_{m+1}$, and wherein the first input of the first resonant converter $G_1$ and the second input of the last resonant converter $G_M$ are electrically coupled to a voltage source for receiving an input voltage.

In one embodiment, each resonant converter $G_m$ further comprises a switch network circuit, $NC_m$, electrically coupled between the first and second inputs and the resonant tank. In one embodiment, the switch network circuit $NC_m$ of each resonant converter $G_m$ comprises a half-bridge circuit or a full-bridge circuit.

In one embodiment, each output capacitor $CF_n$ comprises one or more high frequency filtering capacitors.

In one embodiment, each rectifier $R_{m,n}$ of each resonant converter $G_m$ comprises a half-bridge circuit or a full-bridge circuit.

In yet a further aspect, the present invention relates to a layout of the resonant converter circuit as disclosed above. In one embodiment, the layout includes a main board, and N sub-boards spaced-apart and vertically attached to the main board along a predetermined direction, where for each group, the n-th rectifiers $R_{1,n}, R_{2,n}, R_{3,n}, \ldots R_{M,n}$ of the M resonant converters $\{G_m\}$ and the n-th output capacitor $C_{Fn}$ are spaced-apart disposed on one side of the n-th sub-board, and the n-th transformers $T_{1,n}, T_{2,n}, T_{3,n}, \ldots T_{M,n}$ of the M resonant converters $\{G_m\}$ are mounted on the other side of the n-th sub-board, spatially aligned with and electrically connected to the n-th rectifiers $R_{1,n}, R_{2,n}, R_{3,n}, \ldots R_{M,n}$ of the M resonant converters $\{G_m\}$, respectively.

In one embodiment, the n-th rectifiers $R_{1,n}, R_{2,n}, R_{3,n}, \ldots R_{M,n}$ of the M resonant converters $\{G_m\}$ are placed symmetrically on two sides of the n-th output capacitor on the n-th sub-board.

In one embodiment, the n-th transformers $T_{1,n}, T_{2,n}, T_{3,n}, \ldots T_{M,n}$ of the M resonant converters $\{G_m\}$ are mounted on the other side of the first sub-board by fixing pins of the secondary windings of each of the n-th transformers $T_{1,n}, T_{2,n}, T_{3,n}, \ldots T_{M,n}$ of the M resonant converters $\{G_m\}$ symmetrically on the n-th sub-board.

In one embodiment, the n-th sub-board has a positive output port and a negative output port electrically parallel-connected to the respective n-th output capacitor. The positive and negative output ports of the N sub-boards are electrically parallel-connected to the first and second outputs of the resonant converter circuit, respectively.

The layout further has one or more polarized capacitors disposed on the main board, and wherein the one or more polarized capacitors are electrically parallel-connected to the first and second outputs of the resonant converter circuit.

In one aspect, the present invention relates to a layout of the resonant converter circuit as disclosed above. In one embodiment, the layout includes a main board, and a sub-board vertically attached to the main board, where for each group, the n-th rectifiers $R_{1,n}, R_{2,n}, R_{3,n}, \ldots R_{M,n}$ of the M resonant converters $\{G_m\}$ and the n-th output capacitor $C_{Fn}$ are spaced-apart and orderly disposed on one side of the sub-board along a predetermined direction, and the n-th transformers $T_{1,n}$, $T_{2,n}, T_{3,n}, \ldots T_{M,n}$ of the M resonant converters $\{G_m\}$ are mounted on the other side of the sub-board along the predetermined direction, spatially aligned with and electrically connected to the n-th rectifiers $R_{1,n}, R_{2,n}, R_{3,n}, \ldots R_{M,n}$ of the M resonant converters $\{G_m\}$, respectively, so as to define a respective sub-layout. Each sub-layout is arranged along the predetermined direction.

In one embodiment, the n-th rectifiers $R_{1,n}, R_{2,n}, R_{3,n}, \ldots R_{M,n}$ of the M resonant converters $\{G_m\}$ are placed symmetrically on two sides of the n-th output capacitor on the sub-board.

In one embodiment, the n-th transformers $T_{1,n}, T_{2,n}, T_{3,n}, \ldots T_{M,n}$ of the M resonant converters $\{G_m\}$ are mounted on the other side of the first sub-board by fixing pins of the secondary windings of each of the n-th transformers $T_{1,n}, T_{2,n}, T_{3,n}, \ldots T_{M,n}$ of the M resonant converters $\{G_m\}$ symmetrically on the sub-board.

In one embodiment, the sub-board has M pairs of positive and negative output ports. Each pair of the positive and negative output ports electrically parallel-connected to the respective output capacitor. The M pairs of positive and negative output ports are electrically parallel-connected to the first and second outputs of the resonant converter circuit, respectively.

In one embodiment, the layout further has one or more polarized capacitors disposed on the main board, and wherein the one or more polarized capacitors are electrically parallel-connected to the first and second outputs of the resonant converter circuit.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
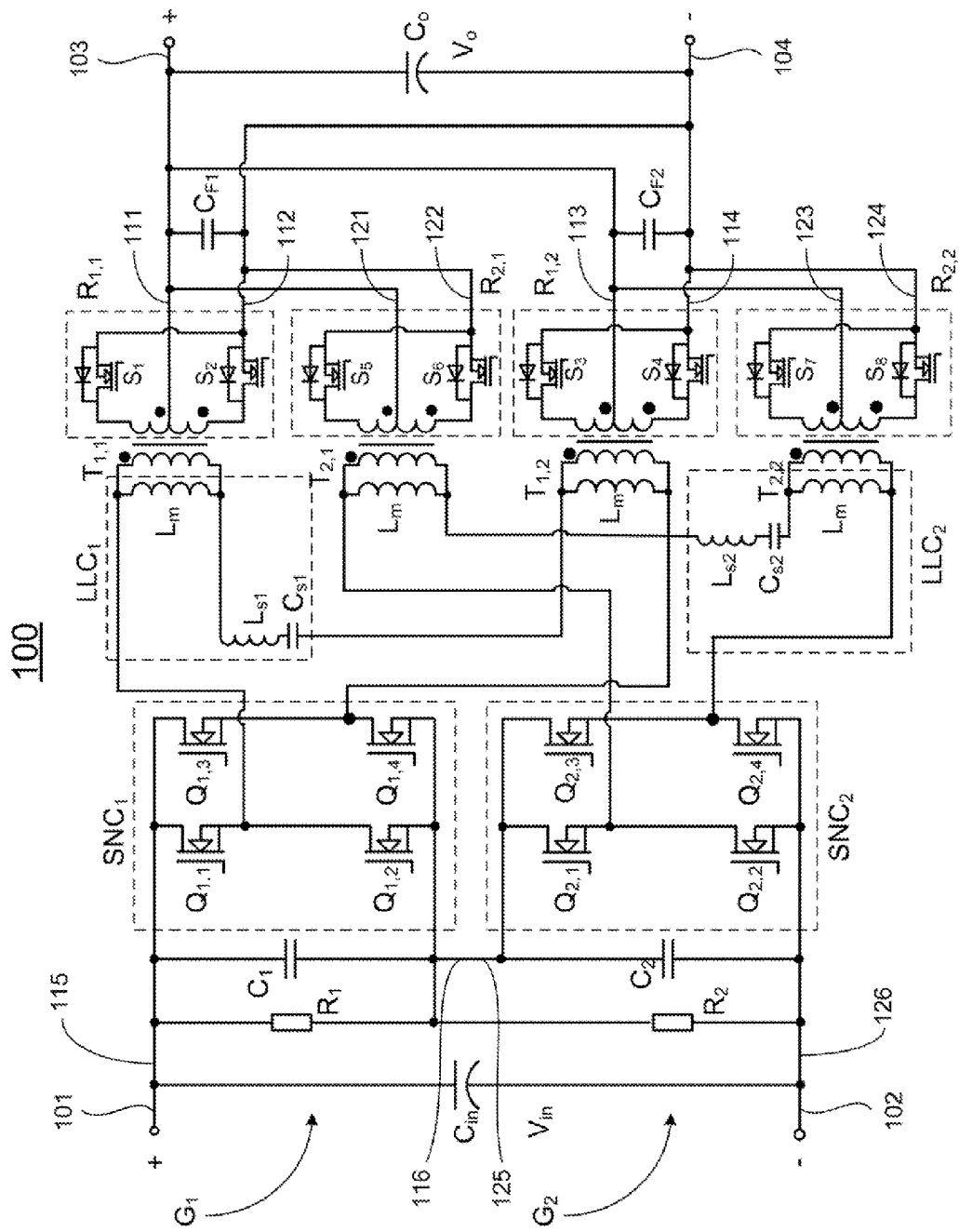
FIG. 1 shows schematically a diagram of a resonant converter circuit according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-7. In accordance with the purposes of this invention, as embodied and broadly described herein, this invention, in one aspect, relates to interleaving converter circuits having multiple transformers and multiple rectifiers, and layouts of the multiple transformers and the multiple rectifiers of the interleaving converter circuits.

Figure 2:
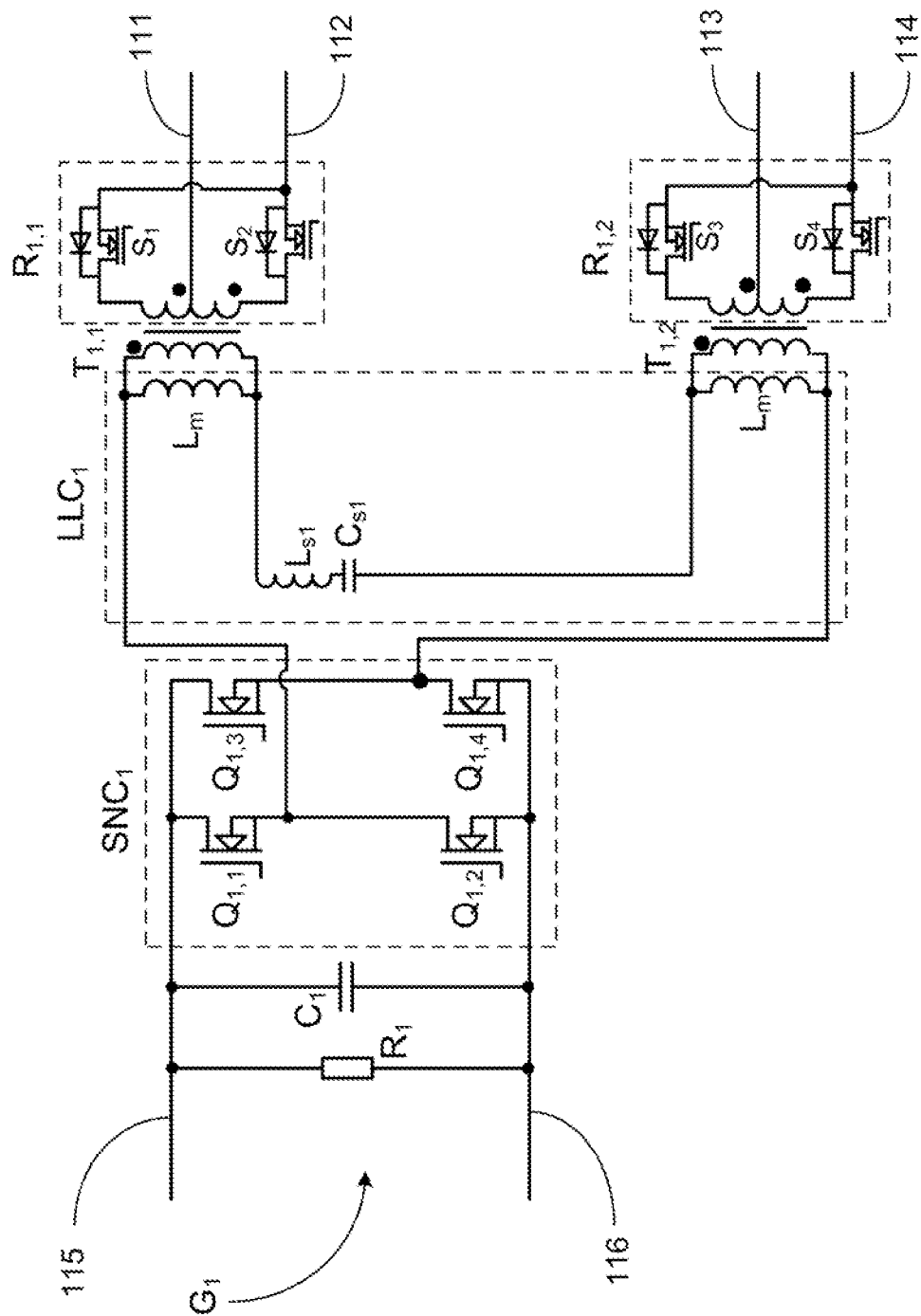
FIG. 2 shows schematically a diagram of a single-phase LLS-SRC utilized in the resonant converter circuit shown in FIG. 1.

Referring to FIGS. 1 and 2, a resonant converter circuit 100 is shown according to one embodiment of the present invention. The resonant converter circuit 100 has a first input 101, a second input 102, a first output 103, a second output 104, a first resonant converter $G_1$ and a second resonant converter $G_2$.

In one embodiment, the first and second resonant converters $G_1$ and $G_2$ are structurally the same. As shown in FIG. 2, the first resonant converter $G_1$ includes a switch network circuit $SNC_1$, an resonant tank $LLC_1$ electrically coupled to switch network circuit $SNC_1$, a first transformer $T_{1,1}$ and a second transformer $T_{1,2}$ electrically coupled to the resonant tank $LLC_1$, a first rectifier $R_{1,1}$ and a second rectifier $R_{1,2}$ electrically coupled to the first transformer $T_{1,1}$ and the second transformer $T_{1,2}$, respectively.

Specifically, each transformer $T_{1,1}/T_{1,2}$ has a primary winding and two secondary windings. The resonant tank $LLC_1$ and the primary windings of the first and second transformers $T_{1,1}$ and $T_{1,2}$ are electrically connected to each other in series. The first and second rectifiers $R_{1,1}$ and $R_{1,2}$ are electrically coupled to the secondary windings of the first and second transformers $T_{1,1}$ and $T_{1,2}$, respectively.

Each rectifier $R_{1,1}/R_{1,2}$ has a first output 111/113 and a second output 112/114. As shown in FIG. 1, the first outputs 111 and 121 and the second outputs 112 and 122 of the first rectifiers $R_{1,1}$ and $R_{2,1}$ of the first and second resonant converters $G_1$ and $G_2$ are electrically parallel-connected to a first output capacitor $C_{F1}$ that is, in turn, electrically connected between the first and second outputs 103 and 104 of the resonant converter circuit 100. The first outputs 113 and 123 and the second outputs 114 and 124 of the second rectifiers $R_{1,2}$ and $R_{2,2}$ of the first and second resonant converters $G_1$ and $G_2$ are electrically parallel-connected to a second output capacitor $C_{F2}$ that is, in turn, electrically connected between the first and second outputs 103 and 104 of the resonant converter circuit 100.

Additionally, each resonant converter $G_1/G_2$ has a first input 115/125 and a second input 116/126. The second input 116 of the first resonant converter $G_1$ is electrically series-connected to the first input 125 of the second resonant converter $G_2$. The first input 115 of the first resonant converter $G_1$ and the second input 126 of the second resonant converter $G_2$ are electrically coupled to the first input 101 and the second input 102 of the resonant converter circuit 100, respectively, for receiving an input voltage $V_{in}$.

In this exemplary embodiment shown in FIGS. 1 and 2, the switch network circuit $SNC_1/SNC_2$ of each resonant converter $G_1/G_2$ comprises a full-bridge circuit. In another embodiment, the switch network circuit $SNC_1/SNC_2$ of each resonant converter $G_1/G_2$ comprises a half-bridge circuit (not shown).

In one embodiment, each of the first and second output capacitors $C_{F1}$ and $C_{F2}$ includes one or more high frequency filtering capacitors.

In the embodiment shown in FIGS. 1 and 2, each of the first and second rectifiers of each resonant converter comprises a half-bridge circuit. The half-bridge circuit is formed of, for example, two TDSON-8 packaged MOS transistors. In another embodiment, each rectifier includes a full-bridge circuit.

As such a configuration, the resonant converter circuit 100 operates in an interleaved mode. Ideally, the amplitudes of the output currents of the rectifiers in the two phases are equal, while and phases are shifted at 90°, and thus an output current of the common output capacitor $C_O$ has small ripples or no ripples. However, in practice, the conductive wires/leads transmitting the rectifier outputs to the common output capacitor in the two-phase interleaved converters may have different lengths and thus different parasitic resistances and parasitic inductances generated therein. The generated parasitic resistances and inductances may cause the asymmetry of the output currents, which results in the ripple increase of the output capacitor and deteriorates the parallel-interleaved effect.

According to embodiments of the present invention, different layouts of the multiple transformers and the multiple rectifiers of the resonant converter circuit are provided, in which the multiple transformers and the multiple rectifiers of the multi-phase converters are interleavingly arranged to be symmetrical to the common output polarized capacitor(s) so as to ensure the rectifier outputs of each phase relative to the common output polarized capacitor is symmetrical, thereby reducing the output ripples of the current of the output capacitors.

Figure 3:
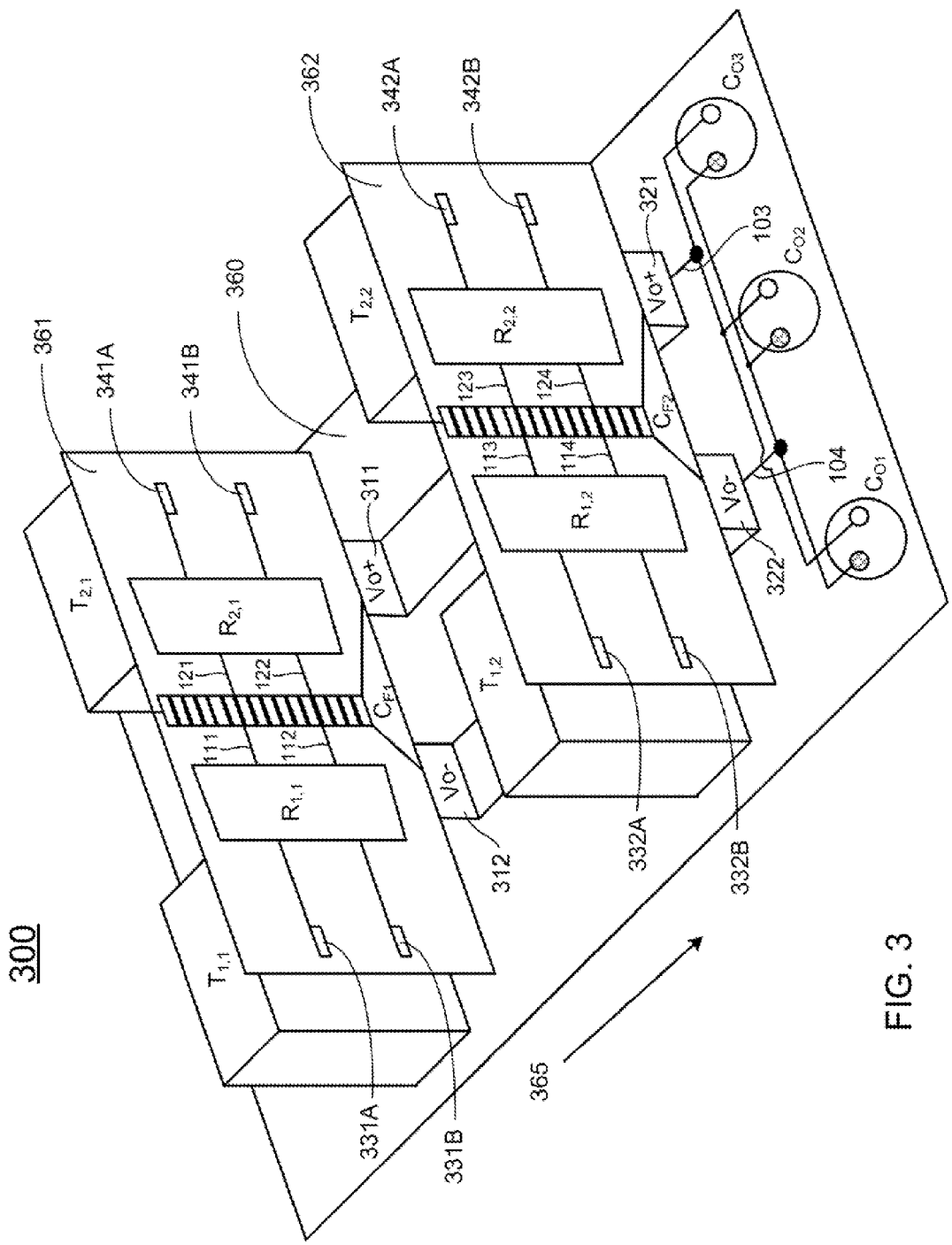
FIG. 3 shows schematically a layout of the resonant converter circuit shown in FIG. 1 according to one embodiment of the present invention.

Referring now to FIG. 3, the layout 300 of the resonant converter circuit 100 shown in FIG. 1 is illustrated according to one embodiment of the present invention. Specifically, the layout 300 includes a main board 360, a first sub-board 361 and a second sub-board 362 spaced-apart and vertically attached to the main board 360 along a direction 365 that is determined based on a specific product design. In one embodiment, each of the main board 360, the first sub-board 361 and the second sub-board 362 includes a printed circuit board (PCB).

In the layout 300, the first rectifiers $R_{1,1}$ and $R_{2,1}$ of the first and second resonant converters $G_1$ and $G_2$ and the first output capacitor $C_{F1}$ are spaced-apart disposed on one side of the first sub-board 361 such that the first output capacitor $C_{F1}$ is placed between the first rectifiers $R_{1,1}$ and $R_{2,1}$ of the first and second resonant converters $G_1$ and $G_2$. Preferably, the first rectifiers $R_{1,1}$ and $R_{2,1}$ of the first and second resonant converters $G_1$ and $G_2$ are placed symmetrically on two lateral sides of the first output capacitor $C_{F1}$. The first rectifiers $R_{1,1}$ and $R_{2,1}$ are electrically connected to the first output capacitor $C_{F1}$. Further, the first transformers $T_{1,1}$ and $T_{2,1}$ of the first and second resonant converters $G_1$ and $G_2$ are mounted on the other side of the first sub-board 361, spatially aligned with and electrically connected to the first rectifiers $R_{1,1}$ and $R_{2,1}$ of the first and second resonant converters $G_1$ and $G_2$, respectively. In the exemplary embodiment shown in FIG. 3, the conductive pins 331A and 331B of the secondary windings of the first transformer $T_{1,1}$ of the first resonant converter $G_1$ is fixed on the first sub-board 361 by welding or other mounting means. Similarly, the conductive pins 341A and 341B of the secondary windings of the first transformer $T_{2,1}$ of the second resonant converter $G_2$ is fixed on the first sub-board 361 by welding or other mounting means. Preferably, the conductive pins 331A and 331B, and 341A and 341B of the secondary windings of the first transformers $T_{1,1}$ and $T_{2,1}$ of the first and second resonant converters $G_1$ and $G_2$, are symmetrically fixed on the first sub-board 361. The first sub-board 361 has a positive output port 311 and a negative output port 312 electrically parallel-connected to the first output capacitor $C_{F1}$.

Furthermore, the second rectifiers $R_{1,2}$ and $R_{2,2}$ of the first and second resonant converters $G_1$ and $G_2$ and the second output capacitor $C_{F2}$ are spaced-apart disposed on one side of the second sub-board 362 such that the second output capacitor $C_{F2}$ is placed between the second rectifiers $R_{1,2}$ and $R_{2,2}$ of the first and second resonant converters $G_1$ and $G_2$. Preferably, the second rectifiers $R_{1,2}$ and $R_{2,2}$ of the first and second resonant converters $G_1$ and $G_2$ are placed symmetrically on two lateral sides of the second output capacitor $C_{F2}$. The second rectifiers $R_{1,2}$ and $R_{2,2}$ are electrically connected to the second output capacitor $C_{F1}$. In addition, the second transformers $T_{1,2}$ and $T_{2,2}$ of the first and second resonant converters $G_1$ and $G_2$ are mounted on the other side of the second sub-board 362, spatially aligned with and electrically connected to the second rectifiers $R_{1,2}$ and $R_{2,2}$ of the first and second resonant converters $G_1$ and $G_2$, respectively. In the exemplary embodiment shown in FIG. 3, the conductive pins 332A and 332B of the secondary windings of the second transformer $T_{1,2}$ of the first resonant converter $G_1$ is fixed on the second sub-board 362 by welding or other mounting means. Similarly, the conductive pins 342A and 342B of the secondary windings of the second transformer $T_{2,2}$ of the second resonant converter $G_2$ is fixed on the second sub-board 362 by welding or other mounting means. Preferably, the conductive pins 332A and 332B, and 342A and 342B of the secondary windings of the second transformers $T_{1,2}$ and $T_{2,2}$ of the first and second resonant converters $G_1$ and $G_2$, are symmetrically fixed on the first sub-board 361. The second sub-board 362 has a positive output port 321 and a negative output port 322 electrically parallel-connected to the second output capacitor $C_{F2}$. The positive output port 311 and the negative output port 312 of the first sub-board 361 are eclectically connected to the positive output port 321 and the negative output port 322 of the second sub-board 362, respectively, which in turn, are eclectically connected to the first and second outputs 103 and 104 of the resonant converter circuit.

By welding the positive output ports 311 and 321 and the negative output ports 312 and 322 of the first and second sub-boards 361 and 362 to the main board 360, the first sub-board 361 and the second sub-board 362 are secured to the main board 360.

Additionally, the layout 300 may further comprises one or more polarized capacitors, e.g., $C_{O1}$, $C_{O2}$, $C_{O3}$, disposed on the main board 360, and are electrically parallel-connected to the first and second outputs 103 and 104 of the resonant converter circuit. The placements of the rectifiers $R_{1,1}$, $R_{1,2}$, $R_{2,1}$ and $R_{2,2}$ and the corresponding transformers $T_{1,1}$, $T_{1,2}$, $T_{2,1}$, and $T_{2,2}$ are preferably symmetrical to the one or more polarized capacitors.

Figure 4:
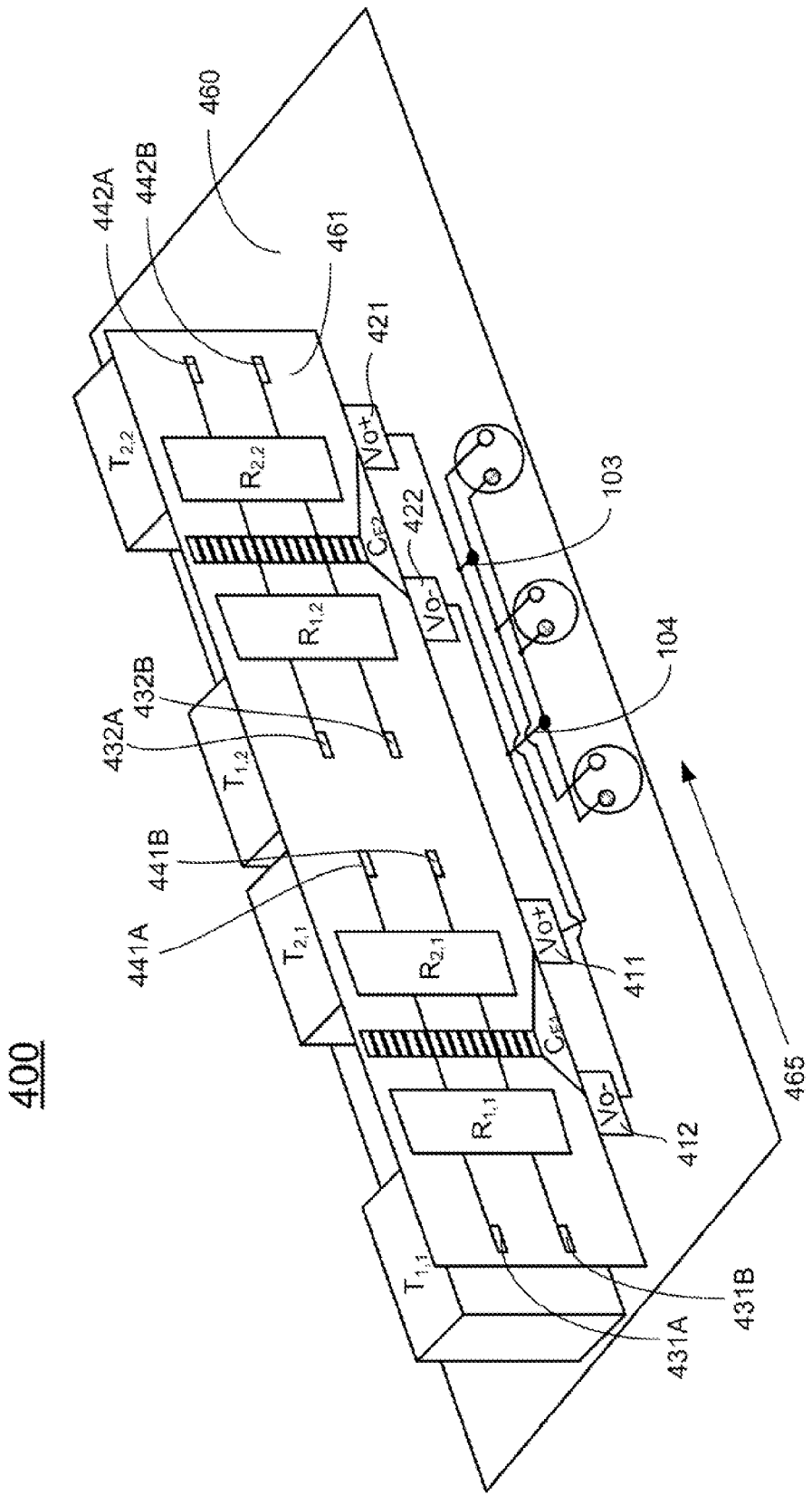
FIG. 4 shows schematically a layout of the resonant converter circuit shown in FIG. 1 according to another embodiment of the present invention.

FIG. 4 shows another embodiment of the layout of the resonant converter circuit 100 shown in FIG. 1. In the embodiment, the layout 400 includes a main board 460, and a sub-board 461 vertically attached to the main board 460.

In this layout 400, the first rectifier $R_{1,1}$ of the first resonant converter $G_1$, the first output capacitor $C_{F1}$, the first rectifier $R_{2,1}$ of the second resonant converter $G_2$, the second rectifier $R_{1,2}$ of the first resonant converter $G_1$, the second output capacitor $C_{F2}$ and the second rectifier $R_{2,2}$ of the second resonant converter $G_2$ are spaced-apart disposed in order on one side of the sub-board 461 along a desired direction 465. Preferably, the first rectifier $R_{1,1}$ of the first resonant converter $G_1$ and the first rectifier $R_{2,1}$ of the second resonant converter $G_2$ are placed symmetrically to the first output capacitor $C_{F1}$. The second rectifier $R_{1,2}$ of the first resonant converter $G_1$ and the second rectifier $R_{2,2}$ of the second resonant converter $G_2$ are placed symmetrically to the second output capacitor $C_{F2}$.

Furthermore, the first transformer $T_{1,1}$ of the first resonant converter $G_1$, the first transformer $T_{2,1}$ of the second resonant converter $G_2$, the second transformer $T_{1,2}$ of the first resonant converter $G_1$ and the second transformer $T_{2,2}$ of the second resonant converter $G_2$ are mounted in order on the other side of the sub-board 461, spatially aligned with and electrically connected to the first rectifier $R_{1,1}$ of the first resonant converter $G_1$, the first rectifier $R_{2,1}$ of the second resonant converter $G_2$, the second rectifier $R_{1,2}$ of the first resonant converter $G_1$ and the second rectifier $R_{2,2}$ of the second resonant converter $G_2$, respectively. In one embodiment, as shown in FIG. 4, each of the first transformer $T_{1,1}$ of the first resonant converter $G_1$, the first transformer $T_{2,1}$ of the second resonant converter $G_2$, the second transformer $T_{1,2}$ of the first resonant converter $G_1$ and the second transformer $T_{2,2}$ of the second resonant converter $G_2$ is fixed on the first sub-board 461 by welding the conductive pins (431A, 431B)/(441A, 441B)/(432A, 432B)/(442A, 442B) of the secondary windings of the corresponding transformer $T_{1,1}/T_{2,1}/T_{1,2}/T_{2,2}$ on the sub-board 461.

In addition, the sub-board 461 has a first positive output port 411 and a first negative output port 412 electrically parallel-connected to the first output capacitor $C_{F1}$, and a second positive output port 421 and a second negative output port 422 electrically parallel-connected to the second output capacitor $C_{F2}$. The first positive output port 412 and the first negative output port 412 electrically parallel-connected to the second positive output port 421 and the second negative output port 422, which are in turn, electrically parallel-connected to the first and second outputs 103 and 104 of the resonant converter circuit. Similarly, by welding the first and second positive output ports 411 and 421 and the first and second negative output ports 412 and 422 of the sub-boards 461 to the main board 460, the sub-board 461 is secured to the main board 460.

In this exemplary embodiment shown in FIG. 4, three polarized capacitors, $C_{O1}$, $C_{O2}$ and $C_{O3}$ are electrically parallel-connected to the first and second outputs 103 and 104 of the resonant converter circuit. Similarly, the placements of the rectifiers $R_{1,1}$, $R_{1,2}$, $R_{2,1}$ and $R_{2,2}$ and the corresponding transformers $T_{1,1}$, $T_{1,2}$, $T_{2,1}$, and $T_{2,2}$ are preferably symmetrical to the one or more polarized capacitors.

Figure 5:
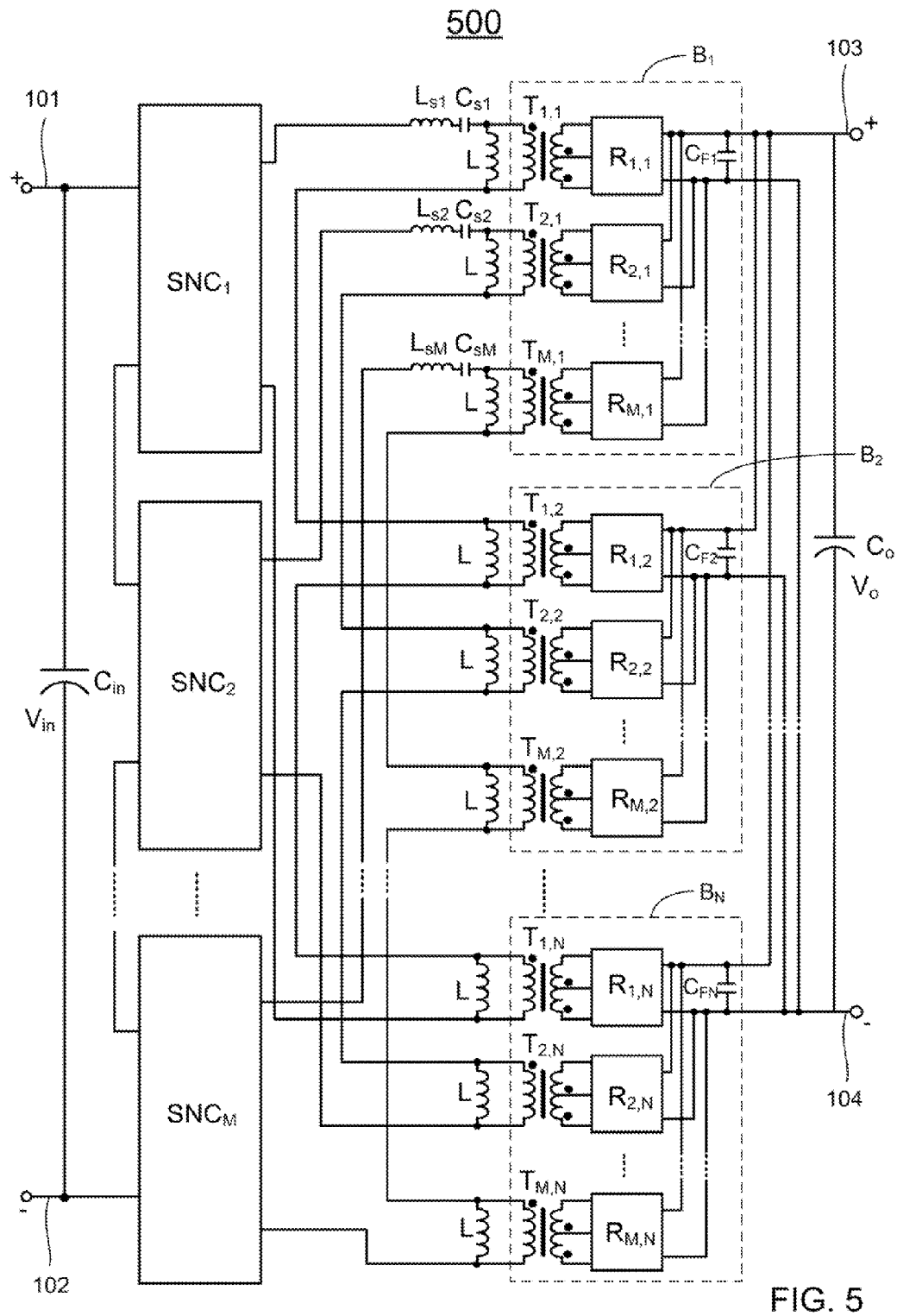
FIG. 5 shows schematically a diagram of a resonant converter circuit according to one embodiment of the present invention.
Figure 6:
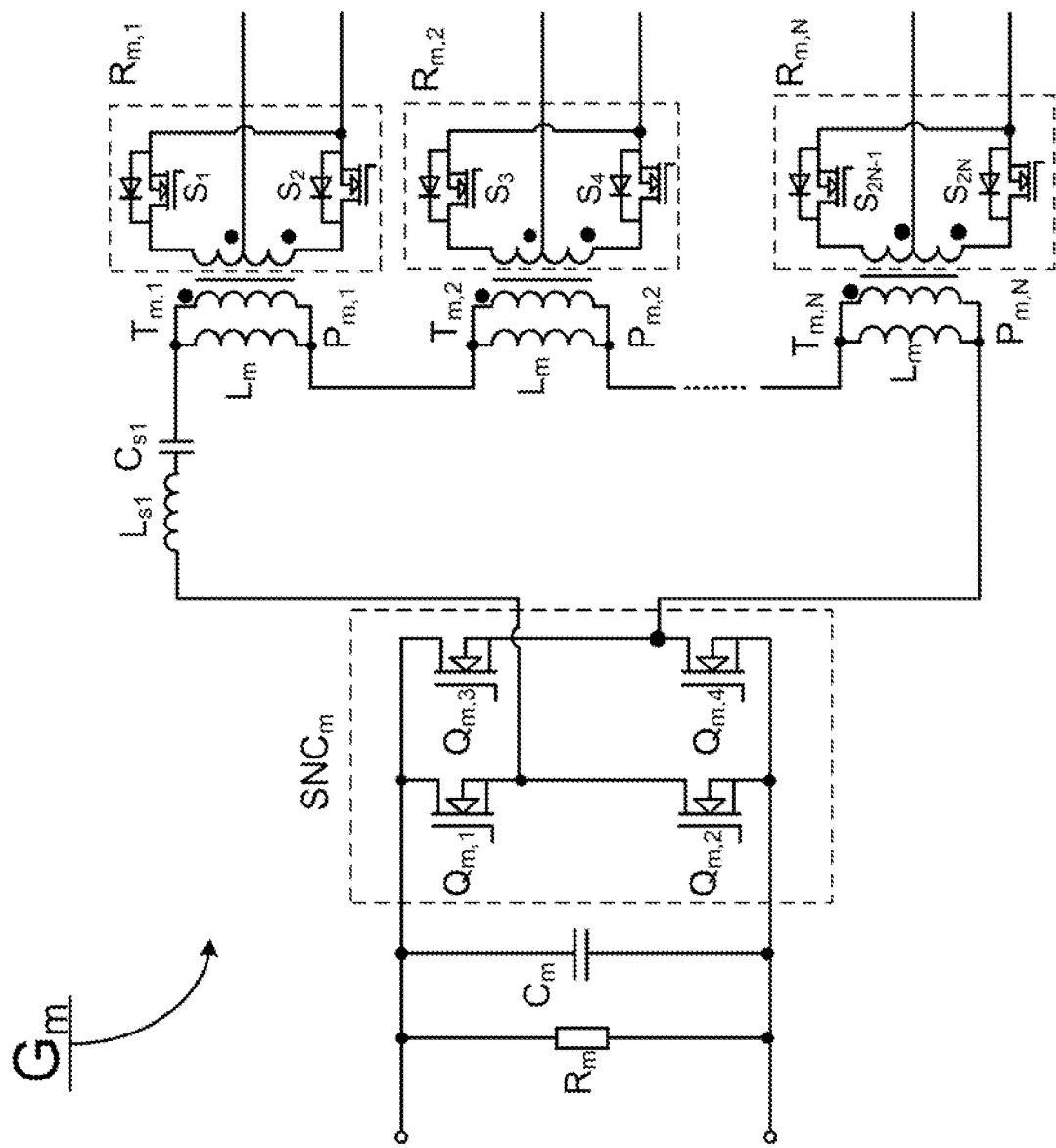
FIG. 6 shows schematically a diagram of a single-phase LLS-SRC utilized in the resonant converter circuit shown in FIG. 5.

Referring to FIGS. 5 and 6, a resonant converter circuit 500 is shown according to another embodiment of the present invention. In the exemplary embodiment, the resonant converter circuit 500 includes M resonant converters, $\{G_m\}$, m=1, 2, 3, ..., M, M being an integer greater than one.

As shown in FIG. 6, each resonant converter $G_m$ has an resonant tank, N transformers $\{T_{m,n}\}$, and N rectifiers, $\{R_{m,n}\}$, n=1, 2, 3, ... N, N being an integer greater than one. Each transformer $T_{m,n}$ includes a primary winding and at least one secondary winding. The resonant tank and the primary windings of the N transformers are electrically connected to each other in series. Each rectifier $R_{m,n}$ is electrically coupled to the at least one secondary winding of a respective transformer $T_{m,n}$. In the embodiment shown in FIG. 6, each rectifier $R_{m,n}$ includes a half-bridge circuit formed of for example, two MOS switches. Additionally, a full-bridge circuit can also be used as the rectifier $R_{m,n}$. Each rectifier $R_{m,n}$ has a first output and a second output.

As shown in FIG. 5, the multiple transformers $\{T_{m,n}\}$ and the multiple rectifiers $\{R_{m,n}\}$, where m=1, 2, 3, ..., M, and n=1, 2, 3, ... N, are arranged in N groups, $\{B_n\}$. Each group $B_n$ includes all the n-th transformers $T_{1,n}$, $T_{2,n}$, $T_{3,n}$, ... $T_{M,n}$ and the n-th rectifiers $R_{1,n}$, $R_{2,n}$, $R_{3,n}$, ... $R_{M,n}$ of the M resonant converters $\{G_m\}$. For each group $B_n$, the first and second outputs of the n-th rectifiers $R_{1,n}$, $R_{2,n}$, $R_{3,n}$, ... $R_{M,n}$ of the M resonant converters $\{G_m\}$ are electrically parallel-connected to a n-th output capacitor, $C_{Fn}$, which is in turn, electrically connected between the first and second outputs 103 and 104 of the resonant converter circuit 500. Each output capacitor $CF_n$ comprises one or more high frequency filtering capacitors. In addition, one or more polarized capacitor Co may electrically coupled between the first and second outputs 103 and 104 of the resonant converter circuit 500.

Further, each resonant converter $G_m$ may also includes a switch network circuit, $NC_m$, electrically coupled to the resonant tank. The switch network circuit $NC_m$ can be a half-bridge circuit or a full-bridge circuit.

Additionally, each resonant converter $G_m$ has a first input and a second input electrically coupled to the switch network circuit $NC_m$. In the exemplary embodiment shown in FIG. 5, the second input of any one but the last resonant converter $G_m$ is electrically series-connected to the first input of its immediate next resonant converter $G_{m+1}$. The first input of the first resonant converter $G_1$ and the second input of the last resonant converter $G_M$ are electrically connected to the first input 101 and the second input 102 of the resonant converter circuit 500, respectively, for receiving an input voltage $V_{in}$.

Figure 7:
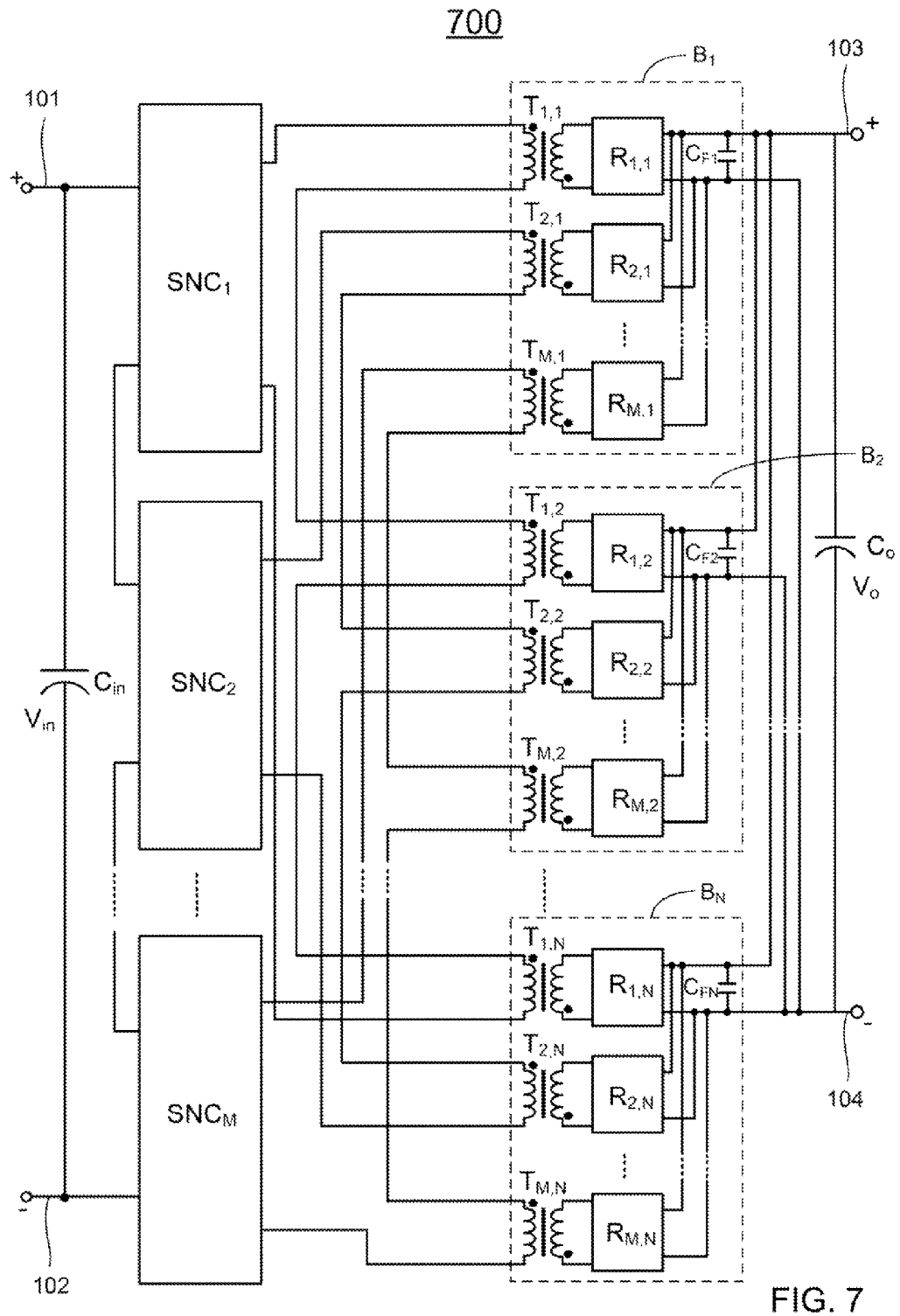
FIG. 7 shows schematically a diagram of a resonant converter circuit according to one embodiment of the present invention.

FIG. 7 shows schematically a resonant converter circuit 700 according to yet another embodiment of the present invention. Similar to the resonant converter circuit 500 shown in FIGS. 5 and 6, the resonant converter circuit 700 includes M resonant converters, $\{G_m\}$, m=1, 2, 3, ... M, M being an integer greater than one. Except that each resonant converter $G_m$ includes only N transformers $\{T_{m,n}\}$, and N rectifiers, $\{R_{m,n}\}$, n=1, 2, 3, ... N, N being an integer greater than one. Each transformer $T_{m,n}$ includes a primary winding and a secondary winding. The primary windings of the N transformers of each resonant converter $G_m$ are electrically connected to each other in series. Each rectifier $R_{m,n}$ is electrically coupled to the secondary winding of a respective transformer $T_{m,n}$. Each rectifier $R_{m,n}$ has a first output and a second output.

As shown in FIG. 7, the multiple transformers $\{T_{m,n}\}$ and the multiple rectifiers $\{R_{m,n}\}$, where m=1, 2, 3, ... M, and n=1, 2, 3, ... N, are arranged in N groups, $\{B_n\}$. Each group $B_n$ includes all the n-th transformers $T_{1,n}$, $T_{2,n}$, $T_{3,n}$, ... $T_{M,n}$ and the n-th rectifiers $R_{1,n}$, $R_{2,n}$, $R_{3,n}$, ... $R_{M,n}$ of the M resonant converters $\{G_m\}$. For each group $B_n$, the first and second outputs of the n-th rectifiers $R_{1,n}$, $R_{2,n}$, $R_{3,n}$, ... $R_{M,n}$ of the M resonant converters $\{G_m\}$ are electrically parallel-connected to a n-th output capacitor, $C_{Fn}$, which is in turn, electrically connected between the first and second outputs 103 and 104 of the resonant converter circuit 700. Each output capacitor $CF_n$ comprises one or more high frequency filtering capacitors. In addition, one or more polarized capacitor Co may electrically coupled between the first and second outputs 103 and 104 of the resonant converter circuit 700.

Further, each resonant converter $G_m$ may also includes a switch network circuit, $NC_m$, electrically coupled to the N transformers $\{T_{m,n}\}$.

Additionally, each resonant converter $G_m$ has a first input and a second input electrically coupled to the switch network circuit $NC_m$. In the exemplary embodiment shown in FIG. 7, the second input of any one but the last resonant converter $G_m$ is electrically series-connected to the first input of its immediate next resonant converter $G_{m+1}$. The first input of the first resonant converter $G_1$ and the second input of the last resonant converter $G_M$ are electrically connected to the first input 101 and the second input 102 of the resonant converter circuit 700, respectively, for receiving an input voltage $V_{in}$.

In one aspect of the present invention, a layout of the resonant converter circuit 500/700 is provided. The layout (not shown) includes a main board, and N sub-boards spaced-apart and vertically attached to the main board along a direction defined by a production design. In the layout, for each group $B_n$, the n-th rectifiers $R_{1,n}$, $R_{2,n}$, $R_{3,n}$, ... $R_{M,n}$ of the M resonant converters $\{G_m\}$ and the n-th output capacitor $C_{Fn}$ are spaced-apart disposed on one side of the n-th sub-board, while the n-th transformers $T_{1,n}$, $T_{2,n}$, $T_{3,n}$, ... $T_{M,n}$ of the M resonant converters $\{G_m\}$ are mounted on the other side of the n-th sub-board, spatially aligned with and electrically connected to the n-th rectifiers $R_{1,n}$, $R_{2,n}$, $R_{3,n}$, ... $R_{M,n}$ of the M resonant converters $\{G_m\}$, respectively. In one embodiment, the n-th transformers $T_{1,n}$, $T_{2,n}$, $T_{3,n}$, ... $T_{M,n}$ of the M resonant converters $\{G_m\}$ are mounted on the other side of the first sub-board by fixing pins of the secondary windings of each of the n-th transformers $T_{1,n}$, $T_{2,n}$, $T_{3,n}$, ... $T_{M,n}$ of the M resonant converters $\{G_m\}$ on the n-th sub-board. Preferably, the n-th rectifiers $R_{1,n}$, $R_{2,n}$, $R_{3,n}$, ... $R_{M,n}$ of the M resonant converters $\{G_m\}$ are placed symmetrically on two sides of the n-th output capacitor on the n-th sub-board.

In one embodiment, the n-th sub-board has a positive output port and a negative output port electrically parallel-connected to the respective n-th output capacitor. The positive and negative output ports of the N sub-boards are electrically parallel-connected to the first and second outputs of the resonant converter circuit, respectively.

The layout further has one or more polarized capacitors disposed on the main board, and are electrically parallel-connected to the first and second outputs of the resonant converter circuit 500/700.

According to the present invention, another embodiment of the layout of the resonant converter circuit 500/700 is also provided. The layout (not shown) includes a main board, and a sub-board vertically attached to the main board. In the layout, for each group $B_n$, the n-th rectifiers $R_{1,n}$, $R_{2,n}$, $R_{3,n}$, ... $R_{M,n}$ of the M resonant converters $\{G_m\}$ and the n-th output capacitor $C_{Fn}$ are spaced-apart and orderly disposed on one side of the sub-board along a predetermined direction, while the n-th transformers $T_{1,n}$, $T_{2,n}$, $T_{3,n}$, ... $T_{M,n}$ of the M resonant converters $\{G_m\}$ are mounted on the other side of the sub-board along the predetermined direction, spatially aligned with and electrically connected to the n-th rectifiers $R_{1,n}$, $R_{2,n}$, $R_{3,n}$, ... $R_{M,n}$ of the M resonant converters $\{G_m\}$, respectively, so as to define a respective sub-layout. Each sub-layout is arranged along the predetermined direction.

Preferably, the n-th rectifiers $R_{1,n}$, $R_{2,n}$, $R_{3,n}$, ... $R_{M,n}$ of the M resonant converters $\{G_m\}$ are placed symmetrically on two sides of the n-th output capacitor on the sub-board.

In one embodiment, the n-th transformers $T_{1,n}$, $T_{2,n}$, $T_{3,n}$, ... $T_{M,n}$ of the M resonant converters $\{G_m\}$ are mounted on the other side of the first sub-board by fixing pins of the secondary windings of each of the n-th transformers $T_{1,n}$, $T_{2,n}$, $T_{3,n}$, ... $T_{M,n}$ of the M resonant converters $\{G_m\}$ symmetrically on the sub-board.

In one embodiment, the sub-board has M pairs of positive and negative output ports. Each pair of the positive and negative output ports is electrically parallel-connected to the respective output capacitor. The M pairs of positive and negative output ports are electrically parallel-connected to the first and second outputs of the resonant converter circuit, respectively.

In sum, the present invention, among other things, recites multi-phase parallel-interleaved converter circuits with each phase having two or more transformers and two or more rectifiers electrically coupled to the two or more transformers, and layouts of the multiple transformers and the multiple rectifiers of the multi-phase parallel-interleaved converter circuits. In the layouts, the multiple transformers and the multiple rectifiers of the multi-phase converters are interleavingly arranged to be symmetrical to the common output polarized capacitor(s) so as to ensure the rectifier outputs of each phase relative to the common output polarized capacitor is symmetrical, thereby reducing the output ripples of the current of the output capacitors.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A layout of a converter circuit, comprising:
   a main board;
   a first sub-board; and
   a second sub-board;
   wherein the converter circuit having a first output and a second output comprises:
      a first converter and a second converter, each converter comprising:
         (a) a switch network circuit;
         (b) a first transformer and a second transformer, each transformer having a primary winding and at least one secondary winding, wherein the switch network circuit and the primary windings of the first and second transformers are electrically connected to each other; and
         (c) a first rectifier and a second rectifier electrically coupled to the secondary windings of the first transformer and the second transformer, respectively, each rectifier having a first output and a second output,
      wherein the first and second outputs of the first rectifiers of the first and second converters are electrically parallel-connected to a first output capacitor that is electrically connected between the first and second outputs of the converter circuit; and
      wherein the first and second outputs of the second rectifiers of the first and second converters are electrically parallel-connected to a second output capacitor that is electrically connected between the first and second outputs of the converter circuit;
   wherein the first sub-board is configured with the first rectifiers of the first and second converters and the first output capacitor which are disposed on the same side of the first sub-board, the first rectifiers of the first and second converters are symmetric about the first output capacitor on the first sub-board to make the distances from the first output capacitor to the two first rectifiers respectively are close;
   wherein the second sub-board is configured with the second rectifiers of the first and second converters and the second output capacitor which are disposed on the same side of the second sub-board, the second rectifiers of the first and second converters are symmetric about the second capacitor on the second sub-board to make the distances from the second output capacitor to the two second rectifiers respectively are close;
   wherein the first sub-board and a second sub-board are perpendicular to the main board.

2. The layout of the converter circuit of claim 1, wherein the first sub-board is connected with two first transformers of the first and second converters, the second sub-board is connected with two second transformers of the first and second converters.

3. The layout of the converter circuit of claim 1, wherein each sub-board has a positive output port and a negative output port to lead out two terminals of the first or second output capacitor to the main board, the positive output ports of the two sub-boards are parallel connected to the first output of the converter circuit on the main board, the negative output ports of the two sub-boards are parallel connected to the second output of the converter circuit on the main board.

4. The layout of the converter circuit of claim 1, further comprising one or more polarized capacitors disposed on the main board, and wherein the one or more polarized capacitors are electrically parallel-connected to the first and second outputs of the converter circuit.

5. The layout of the converter circuit of claim 1, wherein the first transformers of the first and second converters are symmetrically connected with the first sub-board; the second transformers of the first and second converters are symmetrically connected with the second sub-board.

6. The layout of the converter circuit of claim 5, wherein the first transformers are on the same side opposite to the side with the first rectifiers on the first sub-board, the second transformers are on the same side opposite to the side with the second rectifiers on the second sub-board.

7. The layout of the converter circuit of claim 1, wherein the first sub-board and the second sub-board are parallel to each other.

8. The layout of the converter circuit of claim 1, wherein the first sub-board and the second sub-board are perpendicular to the main board along the same line and integrated into one single sub-board.

9. The layout of the converter circuit of claim 1, wherein one of the converters is a resonant converter.

10. The layout of the converter circuit of claim 9, wherein each resonant converter has a first input and a second input, wherein the second input of the first resonant converter is electrically series-connected to the first input of the second resonant converter.

11. The layout of the converter circuit of claim 10, wherein each resonant converter comprises a resonant tank, electrically coupled between switch network circuit and the transformer.

\* \* \* \* \*